Dec. 8, 1936.    J. A. H. BARKEIJ    2,063,362
INTERNAL COMBUSTION ENGINE
Filed April 26, 1930    3 Sheets-Sheet 1
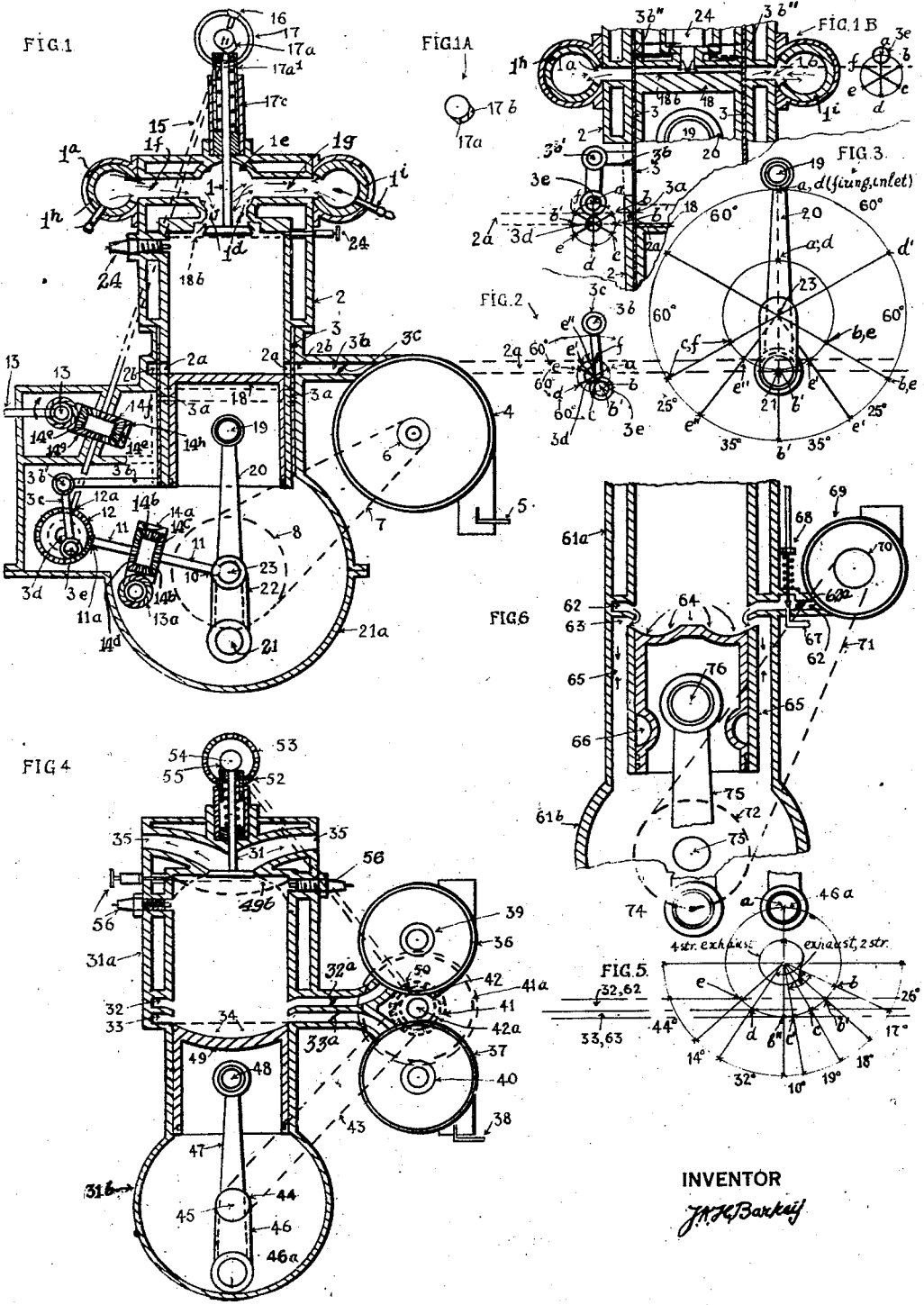
INVENTOR
J.A.H.Barkeij Dec. 8, 1936.  J. A. H. BARKEIJ  2,063,362
INTERNAL COMBUSTION ENGINE
Filed April 26, 1930  3 Sheets-Sheet 2
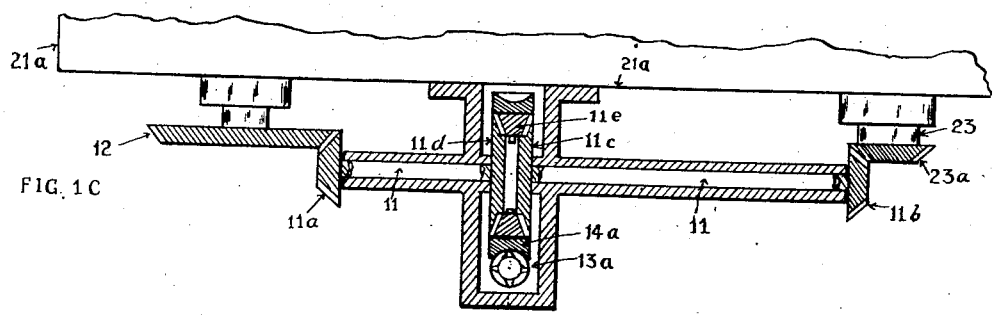
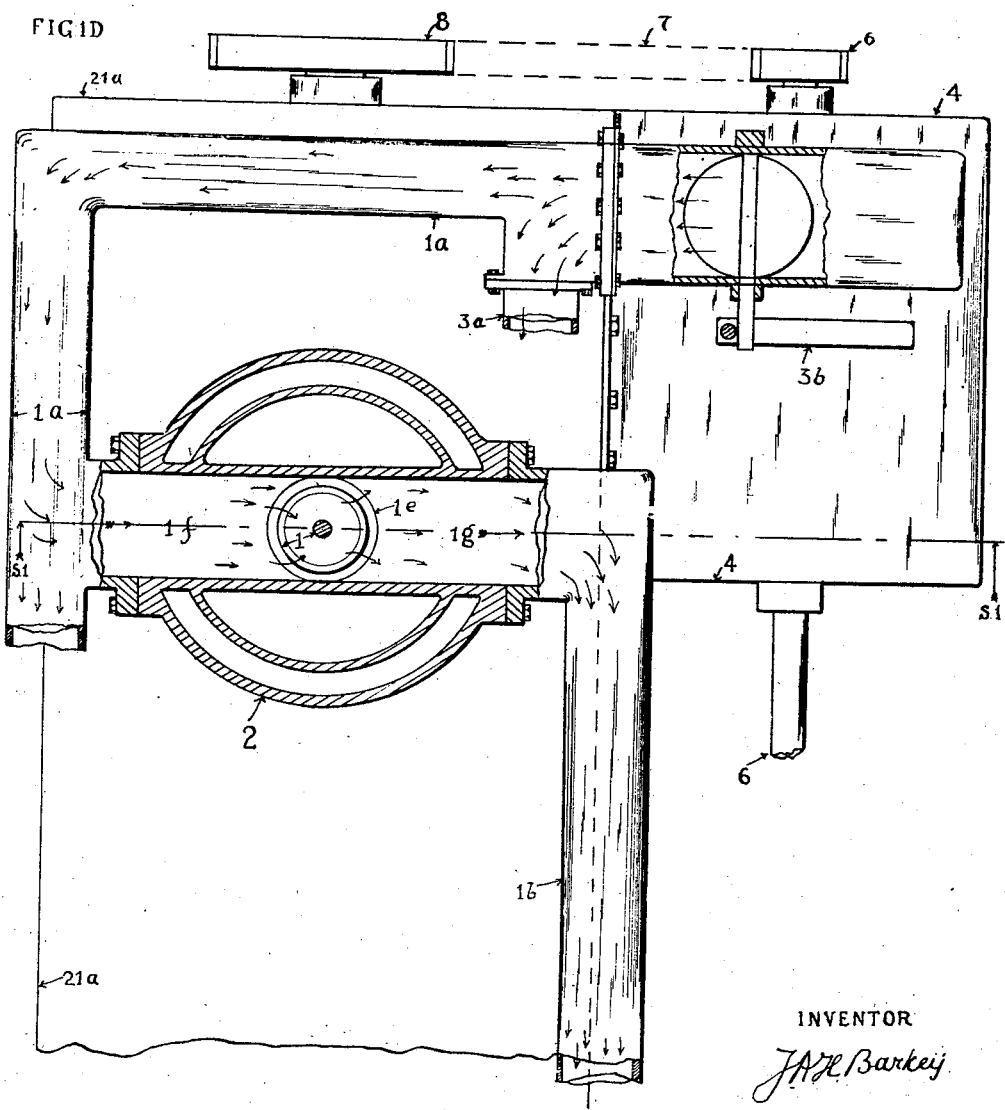
INVENTOR
J. A. H. Barkeij Dec. 8, 1936. J. A. H. BARKEIJ 2,063,362
INTERNAL COMBUSTION ENGINE
Filed April 26, 1930 3 Sheets-Sheet 3
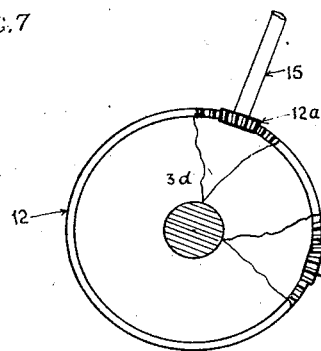
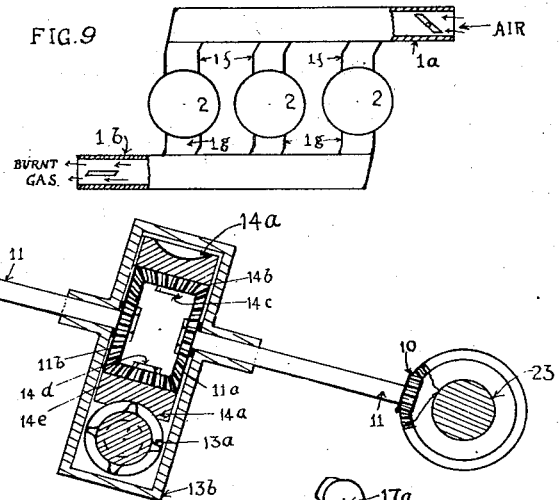
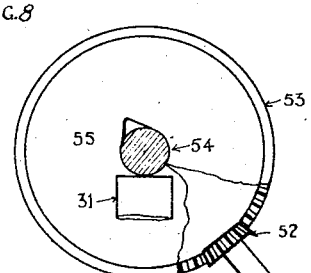
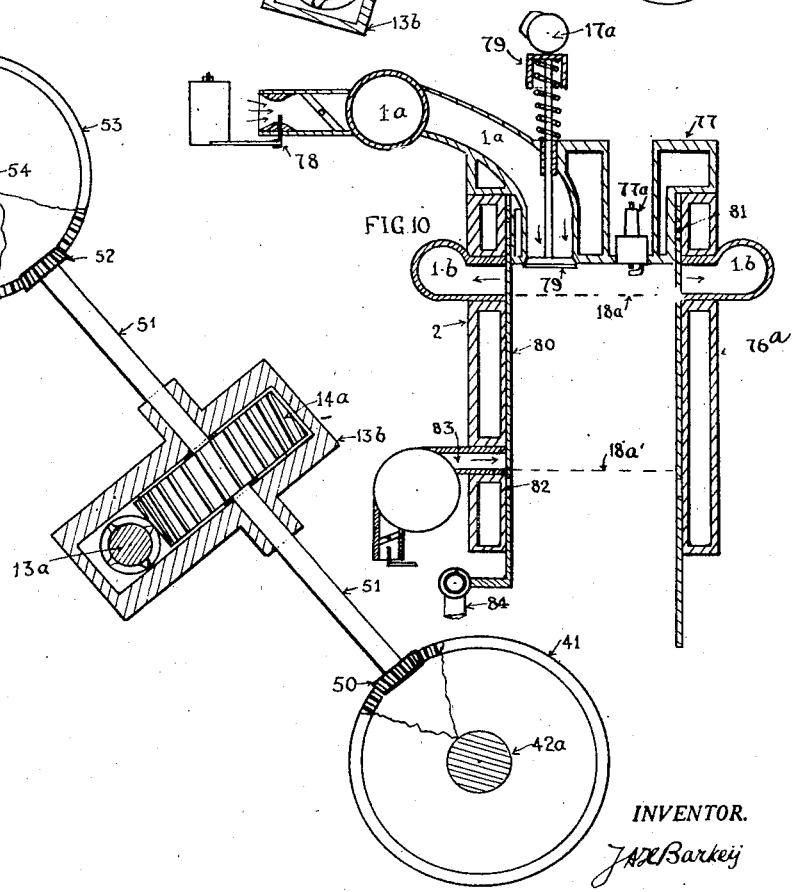
INVENTOR.
J A H Barkeij Patented Dec. 8, 1936

2,063,362

UNITED STATES PATENT OFFICE 2,063,362

INTERNAL COMBUSTION ENGINE

Jean A. H. Barkeij, Altadena, Calif.

Application April 26, 1930, Serial No. 447,520

9 Claims. (Cl. 123—79)

This case is a continuation in part of my application Serial No. 157,845, filed Dec. 29, 1926, part of which is now Patent No. 1,874,419 of April 30, 1932.

In the original specification, it was proposed to run the same engine on the Otto cycle with reduced compression by rejecting a part of the charge during the compression stroke through the valvular means in the top end of the cylinder, and to run it on the Diesel cycle with increased compression by eliminating said rejection, the timing of these valvular means being controlled by a differential mechanism to be explained hereafter. This subject is shown clearly in Figs. 1 and 4 by means of the fuel mixing means 5 and throttle 3c in Fig. 1, and fuel mixing means 38 and throttle 33a in Fig. 4, (and also in fuel mixing means 67 in Fig. 6) and shows further that the volatile mixture is introduced in the fourstroke cycle as well as in the two stroke cycle directly into the cylinder through a separate manifolding (in Fig. 1 and the same manifolding in Fig. 6) and differs therefore substantially from the arrangement as shown in the Patent No. 1,499,145 of June 24, 1924 to T. A. Bell of Australia, who uses the same manifolding for both cycles. However, this subject matter is not claimed in the present application but is continued in my copending application No. 718,-420 of March 31, 1934 and in my copending application No. 18,481 of April 26, 1935, showing interconnecting mechanism to effect said two cycles in succession in the same engine.

My first object is to construct a Diesel engine, having a single valve in top of a cylinder, exhausting the complete volume of burned gas, and admitting air, or air plus burned gas, only through said same valve, and fuel injection under pressure for a fourstroke cycle Diesel operation (Fig. 1 or 1B).

My second object is to add an additional port in the lower end of the cylinder, only controlled by the piston reciprocating in said cylinder, or controlled by additional means. (Which may be varied in timing alone or together with the variation of timing of said single valvular means at the top end of the cylinder. See fifth object.)

My third object is to inject by means of a compressor, a scavenging and an additional charge in said cylinder, or only the latter charge, respectively at the beginning of the exhaust period and the end of the inlet period (Fig. 1 or 1B).

My fourth object is to vary the opening and closing of said single valve, at the top end of the cylinder (Figs. 1 and 1B).

My fifth object is to vary the opening and closing of said valvular means at the lower end of the cylinder, together or separately from the variation of timing of said single valve (Fig. 1 plus 1B).

My sixth object is to construct a similar engine, as explained in said previous five objects, by the application of a single sleeve valve controlling the upper ports and the lower ports simultaneously. The sleeve contains in its upper part two ports opposite each other, like the inner sleeve in a standard Knight engine (see Figs. 14–23). The pressure of a blower can be exerted on one of said ports, and suction on the other port, to evacuate the burnt gases more positively out of one port (in one manifold), and introducing the air charge more positively and exclusively through the other port. This same object can be obtained with a single poppet valve engine, as shown in Fig. 1, by connecting the passage of the valve to a zone, in which two passages meet each other substantially in line with each other (Fig. 1B).

My seventh object is to vary the opening and closing of this single sleeve valve of the sixth object (Fig. 1B).

My eighth object is to apply a single sleeve valve in the top end of a cylinder and to construct scavenging and inlet ports in the lower end thereof, controlled by said piston, and means to vary the opening and closing of this valve may be equally applied here (Fig. 1B).

My ninth object is to increase the additional charge in a fourstroke cycle engine, as explained in the second object, by means of a blower, in cooperation with the pressure created under the piston in a crankcase, as shown; or in a separate chamber under the piston, formed by a piston rod plus a stuffing-box, as is well known in the art, and therefore not shown here. The upper part of the cylinder is like in Fig. 1 (Fig. 1 combined with Fig. 6).

My tenth object is to apply the ninth object equally on a two stroke engine, having a single exhaust valve in the top of the cylinder, as shown in Fig. 4, and to apply also the 4th and 7th objects (Figs. 4 and 6 combined).

My eleventh object is to apply the 9th and 10th objects on an engine having a single sleeve valve as shown in Fig. 1B. For the fourstroke engine this valve will be reciprocated at half the frequency of the crankshaft rotation and piston reciprocation, in the two stroke engine with the frequency of the piston reciprocation. Also in this case the opening and closing of these valves may be varied as will be explained for the foregoing objects (Fig. 6 combined with Fig. 1B, or Figs. 6 and 4 combined with Fig. 1B).

Fig. 1 is a vertical section of a fourstroke cycle engine.

Fig. 1A is a modification of Fig. 1, in which the period of opening of the valve 1 is lengthened to 360° or more (limit about 480°). The valve cam in Fig. 1A is shown at one end with a cam face equal to that shown in Fig. 1. This sliding cam face may be moved in axial direction so that a longer cam face 17b gradually comes in contact with the valve guide 17a¹ as shown in Fig. 1. This moving of a camshaft is old in the art and may be executed in every form which is desirable for a given engine.

If in the following description the cam face 17a is quoted it merely indicates that the shorter valve lift of 360° (not more) is supposed to be used for the construction or operation being described. If the cam face 17b is quoted the longer cam face (longer than 360°) with a maximum of about 480° is supposed to be operating in the corresponding description, or construction.

If this cam is quoted as 17a or 17b, this means that the length of the valve lift may be increased by moving or sliding the cam and the shaft in axial direction while it remains, of course, in driven relation to the engine, as described further on, or as shown in Patent 1,316,977, Sept. 23, 1919 to H. R. Ricardo, or in Patent 1,012,652 of Dec. 26, 1911 to M. C. Kessler.

Fig. 1B shows the same arrangement as Fig. 1, a single sleeve valve combining the function of the two valves shown, or only the function of the upper valve 1 in Fig. 1.

Fig. 1C shows the differential mechanism of Fig. 1, located between the crankshaft and the camshaft 12 on a greater scale and in a plane perpendicular to the longitudinal axis of the crankcase and the crankshaft 23 therein. The wormgear 13a, 14a, is rotated by hand.

Fig. 1D shows that the air compressor or blower 4 may be connected to the inlet passage 1a of Fig. 1, in order to blow air into the inlet-passage 1f to the left of the valve 1 and in the exhaust-passage 1g to the right thereof. When the exhaust period has finished this air is blown into the cylinder past the valve 1, as will be described hereinafter. Each passage is connected with a manifold, connected to several cylinders, one exhaust manifold and one inlet manifold.

Fig. 2 explains the various positions of the crankpin on the eccentric shaft, driving the sleeve valve of Fig. 1, in relation to Fig. 3, and in relation to the positions of the upper edge of the piston with respect to port 2a in cylinder, lower end.

Fig. 3 explains the various positions of the crankpin of the crankshaft during a four-stroke cycle, in relation to the positions to be explained for Fig. 2, and in relation to the piston position and port 2a in cylinder 2.

Fig. 4 is a vertical section of a two stroke cycle engine.

Fig. 5 shows the different positions of the upper edge of the piston with respect to the edges of the two ports 32, 33 in the lower end of the cylinder of Fig. 4, and the positions of the crankpin relative to the piston positions.

Fig. 6 is a vertical section of the lower end of the cylinder, plus a crankcase below said cylinder for crankcase compression, in cooperation with the pressure of a blower.

Fig. 7 shows again the differential mechanism for a four stroke cycle engine between crankshaft 23 and camshaft 12 of Fig. 1, and Fig. 8 shows the same arrangement for the retarding and advancing of the timing of the exhaust valve 31 of the two-stroke-cycle-engine of Fig. 4, when applied between the countershaft 42a and camshaft 54 of Fig. 4.

Fig. 9 shows that in a multicylinder engine the inlet passages 1f may be connected to a common inlet conduit, 1a, the inlet of which conduit 1a may be controlled by a valve, and likewise the exhaust passage 1g of every cylinder may be connected to a common exhaust conduit 1b, the exhaust of which conduit 1b may be controlled by a valve.

In Fig. 10 is shown that the exhaust may be controlled in a fourstroke cycle engine by a port in a sleeve valve at the upper end thereof and the inlet by a poppet valve. The engine may be supercharged by a pump through ports in the lower end of said sleeve controlling ports in the lower end of said cylinder. The sleeve valve controls again inlet ports at the lower end of the cylinder for supercharging said engine above atmospheric pressure at all speeds.

Fig. 10 refers to a fourstroke cycle engine.

It is understood in the Figures 1B, 2, 3, and 5, that the angularity of the connecting rod does not affect the position of the upper edge of the piston during the upper and lower half of the rotation of the respective eccentric shaft and crankshaft. (In other words the public and this applicant know it does affect it, but the engineer applying the present invention has to consider such differences in his particu.;r design.)

Similarly the angularity of the small connecting rod 3c is supposed not to affect the corresponding position of the upper edge of the lower port 3a in the sleeve, and the lower edge of the upper port 3b'' in said sleeve.

In Fig. 1, 1 is the combined inlet and exhaust valve, 2 is the cylinder, 3 is the sleeve controlling with the piston the cylinderport 2a. Lug 3b on said sleeve, carries a wristpin 3b', a connecting rod 3c, connecting said wristpin, to a crank 3e on an eccentric shaft 3d. Said shaft is driven by the shaft 11 through the well known pinions 11a and 10, respectively driving gearwheels 12 on the eccentric shaft 3d, and 23 on the crankshaft. Between the crankshaft and eccentric shaft is a differential composed of two gearwheels 14b and 14d on the opposite ends of the shaft 11, cut in two. Between said gears 14b and 14d are the gearwheels 14b, (two or more), rotatable on a ring 14a, carrying a wormgear 14a, rotated by a worm 13a. These gearwheels 14b rotate loosely on radial studs, which are fastened at their outer ends to the ring 14a carrying said wormgear rotated by said worm 13a. It is, of course, understood that the wormgear and the worm may be replaced by bevel or spiral gears, as used in the differentials of the rear axles of automobiles, and also that the worm 13a may have such a slant, that the rotation of the worm in clockwise or counterclockwise direction causes rotation of the wormgear, carrying said gearwheels 14b, in either clockwise or counterclockwise direction.

The operation of this differential is as follows: If the worm 13a is rotated, the wormgear 14a rotates also. If the gear 13a is rotated clockwise, the wormgear rotates clockwise. While the engine is running, the crankshaft offers more resistance to rotation than the eccentric shaft, consequently, the pinions 14b rotate the gearwheel 14d clockwise, the pinions 14b rotating counterclockwise. The shaft 3d is advanced clockwise, and the ports 2a in the cylinder are uncovered by the ports 3a in the sleeve 3 in the fourstroke cycle earlier than before the worm 13a was operated. If the worm 13a is rotated counterclockwise the operation takes place in reverse order, retarding the uncovering of the ports 2a in the cylinder by the ports 3a in the sleeve 3. It is, of course, understood, that the present mechanism to vary the relative position between crankshaft and eccentric shaft is merely an example, as the essence of the invention is the thermodynamical advantage obtained from the retarding and advancing of the opening and closing of a single combined exhaust-inlet valve, especially for the Diesel cycle as will be further explained. For instance in a radial type of engine, as is used on aeroplanes, the valves can be operated by cams on a single ringgear rotated from the crankshaft, within said gear, by means of intermediate planetary gears freely rotating on studs fixed to said intermediate ringgear. If said ringgear is rotated, the relative position of the crankshaft and the timing of the valves will be equally retarded or advanced. There are several mechanisms already patented, which will vary the opening and closing of valves, as for instance in Patent 1,787,717 to G. Boulet, Jan. 6, 1931, and applicant therefore does not desire to limit himself to any particular design, provided a single, combined inlet-exhaust valve is varied in its timing as will be explained further. It is equally possible, as explained in the original specification, to have a cam with variable length of opening and closing, as is well known in the art, but never proposed for a single exhaust-inlet valve. The combination of a variable timing and variable length of timing of a single inlet and exhaust valve is also understood to be included in the scope of the claims. The variable timing is only preferred to the variable length of timing of said valve, on account of the simplicity of the construction of the former as can be easily ascertained by comparing the present design with, for instance, that shown in Patent No. 1,494,763 to F. R. West, or Patent No. 1,445,653 to C. R. Watson, or Patent No. 1,289,498 to W. McHarry. For the present design it is essential only that a third element is located between the crankshaft and the camshaft to alter the relative position between the two, and altering thereby the timing of the valves without altering the length of the period of lifting of said single combined exhaust-inlet valve.

In connection herewith it may not be entirely superfluous to point out in view of the following description that the present description contains two methods to retain the necessary temperature in the cylinder at the approximate end of the compression period to ignite the fuel injected. One is the variation of the valve timing, resulting in a rejection of part of the charge whereby the compression is raised and lowered at the will of the operator. The compression is raised at lower speeds and lowered at higher speeds to increase the final compression temperature of the air, when the cylinder is comparatively cold on account of few explosions or combustions, and to decrease it when the cylinder is comparatively hot, on account of many successive explosions, which is, of course, especially the case with air-cooled cylinders, more so than with watercooled cylinders. On the other hand, when this engine is used in aeroplanes subject to greatly varying atmospheric pressures, it is also very convenient to increase the compression at high altitudes, in which the cylinder is filled with a smaller charge than at low altitudes, also in order to retain the proper final compression temperature for fuel-ignition. In the latter case the difference between air and watercooling is also important, as the temperature of the air decreases also rapidly at high altitudes. Therefore the variation of the timing should be entirely independent of the engine-speed, but should be under control of the operator at all times under any altitude and at any temperature of the surrounding air.

On the other hand, there is also proposed in this application a method to control the final air-compression temperature by means of increasing and decreasing the amount of burned gas reintroduced in the cylinder via the same valve. The control of this method is equally in the hands of the operator at all times and can be operated in unison or independent of said first method of timing-variation, the purpose of this second method being exactly the same as that of said first method.

The compression temperature at low speeds may be increased by the reintroducing in the cylinder of more burned gas and less cold air, without changing appreciably the compression rate. However, at high altitudes, when the present engine operates without a blower, as shown in the figures at the lower end of the cylinder, the atmospheric pressure is lower and less air will rush into the cylinder via the single valve 1. Therefore to increase the gas pressure in the cylinder at approximately the end of the inlet period, both the inlet and exhaust side of the cylinder may be throttled in order to retain a part of the final expansion pressure. However, this latter method increases the amount of the burned gas in proportion to the amount of air too much, the power will fall off, notwithstanding the higher initial pressure before compression starts. Therefore it is evident that at high altitudes the blower becomes an extremely useful element to retain the full power of the engine. The blower can be applied on the inlet manifold 1b, but it will be then impossible to obtain an initial pressure in the cylinder before compression by the piston appreciably above that of the surrounding atmospheric pressure at any given altitude. Therefore the blower supercharges said cylinder through a second valve controlled port. In the present design it is preferred to place this second port at the extreme lower end of the cylinder for several reasons. First the blower is released from the greatest part of its work by introducing a part, the initial part, of the total charge by the atmospheric pressure itself, supplementing the rest at the expense of work derived from the blower driven by the engine itself. Second the blower can therefore be smaller and lighter, of particular importance for aeroplanes. Third the piston controls the admittance of the additional superatmospheric charge, which protects eventual damage of the blower in case of detonation or contraexplosion etc. The piston operates mechanically throughout, an ordinary mechanically operated valve is entirely automatic during its closing period. Valves do stick once in a while and if this additional air is introduced independent of the piston operation but dependent upon valve operation, the blower may be damaged beyond repair. Fourth the piston is a rapidly closing valve and allows additional ports of dimensions, greater than which can be obtained by any valves in addition to the single (or double, triple etc.) valve to be used for exhaust and inlet and the top end of the cylinder. Therefore the particular position of the blower is also of imperative importance, if only a single combined exhaust-inlet valve is used, especially for reason of the possibility of a superatmospheric charge.

The same points are of extreme importance in the two stroke cycle types shown, in which also a single valve is in the top of the cylinder. This latter valve is here only an exhaust valve, the charge being introduced from the lower end of the cylinder. Equally here, the exhaust may be throttled to increase the volume of burned gas for the next charge, and equally the timing may be variable to increase and decrease the initial compression-pressure before the piston begins to compress. The variability of the valvetiming, however, in the two-stroke-cycle Diesel engine, is much more restricted than in the fourstroke cycle on account of the shorter periods and on account of the fact that a blower (or crankcase compression, with or without the additional blower compression, see copending case, application No. 157,846, Dec. 29, 1926, now Patent 1,874,419), is always necessary to get the next charge in the cylinder displacing the old charge, so that the blower is more liable to be subjected to the unusual strain of the final expansion pressure of the previous combustion or explosion. Variability in the length of the timing is more desirable here. If in a two-stroke engine the relative positions of the exhaust and inlet ports are reversed, so that the inlet is at the top and the exhaust at the lower end, the valve controlling the inlet side can be varied similarly as the exhaust valve in the present arrangement, and the exhaust port at the lower end of the cylinder can be equally throttled to obtain a varying burned gas-air ratio in the cylinder for the next charge.

It is particularly understood that under Diesel-cycle is understood, only that type of engine in which an aircharge, or burned gas-air charge, is compressed under relatively higher pressure than in an explosive type of engine, as for instance shown in Patents 753,003 and 825,867 to A. G. Ronan, and in which the fuel charge, which comprises hydrocarbons of slower volatility than gasoline, benzine, benzol, etc. is injected during the latter stages of the compression periods, be it a fourstroke or two stroke cycle engine. Especially the two-stroke-cycle type, in which volatile fuel is injected in the airstream produced by a blower to a two-stroke engine, which fuel-injection is interrupted by intervals to prevent loss of fuel through the exhaust port of a two stroke cycle engine, as happens in other well known two stroke-cycle-engines. In the latter type, as shown and described, and as is well known in the art, the position of the inlet and exhaust ports can be reversed so that the fuel is injected in the passage leading to the inlet valve in the top of the cylinder and the exhaust is controlled by the piston. The same system of fuel injection can, of course, be applied, to a four-stroke cycle engine during the inlet, and downstroke of the piston, and in both types the fuel may be equally injected after the inlet valve and inlet port, directly into the cylinder, in which case this latter engine still differs fundamentally from the Diesel type of engine, in which fuel of a high ignition point is introduced into the cylinder, not during the inlet period but during the end of the compression period, be it a four or two-stroke cycle engine. In the true Diesel type, the temperature of the compression ignites the fuel, and not spark-, or other, ignition means.

In the arrangement of Fig. 1, it is normally supposed that the lower differential 14a, is not operated, as the operation thereof affects the timing of the opening and closing of the valve 1. The variation thereof is by preference effected in a similar way, by the upper differential 14h and worm 13. The basic operation of the arrangement of Fig. 1 is normally supposed to be without the additional ports 2a and the sleeve 3, and this basic operation can be effected without the upper differential 14h and 13; the latter being a modification, and the former arrangement being a modification, explained later.

Crankshaft and gearwheel 23, crankarm 22, crankpin 21, connecting rod 20, wristpin 19, drive the piston 18, and the blower 4 via gearwheel 8, chain 7, and gearwheel 6.

The blower 4, may carry at its inlet side a carburetor 5, and is connected at its discharge end by passage 3b, with ports 2b and 2a on opposite sides of the sleeve 3, with ports 3a, but is normally not provided with fuel mixing means.

The valve 1 is operated by a cam 17a or b on a shaft driven by a gearwheel 17, pinion 16, shaft 15 (via eventual upper differential 13, 14e—14h), pinion 12a on said gearwheel 12, on said eccentric shaft 3d, as explained.

The valve 1 opens and closes a passage 1d (which passage may be equal to the smaller circumference of the seat of valve 1, providing thereby a kind of Venturi tube, accelerating the speed of the ingoing and outgoing gases; more or less like a similar restriction, between the valve and the combustion chamber, as explained in my applications 152,708 December 4, 1926, 254,543 February 15, 1928, and 273,302 April 27, 1928, and close to said valve accelerates the speed of ingoing and outgoing gases in reverse order, as a restriction before the valve, as shown here). Said passage connects with a zone 1e, connected to the left and right with substantially aligned passages, 1f and 1g, which respectively connect with an exhaust manifold 1a and an inlet manifold 1b. Pressure may be exerted in manifold 1a with a blower as shown, and (or) suction may be applied in manifold 1b, by means of exhaust ejectors, the exhaust of one cylinder intensifying that of the other cylinder(s), as well known in the art and as explained for instance in patent to Mädler No. 1,543,717, and to Büchi No. 1,477,994 for a single cylinder. Said blower is shown in Fig. 1D connected with a passage 1a, leading to the inlet passage 1f, and also connected with a passage 3a as shown already in Fig. 3. It is, of course understood, that the blower may be either only connected with passage 1a or only with passage 3a, or with both. The blower and passages 1a and 3a may be further controlled by a valve 3b. This valve 3b is equally controlled by hand by the operator, like the worm 13a as described above for the variation of the timing of the valve gear. A similar valve may be applied in the passage 3a of Fig. 1 or in the passages between the air pumps 36 and 37 and the cylinder 31a of Fig. 4 or in the passage 67 of Fig. 6. If separate blowers are used for passage 1a and 3a, separate throttles may be used to control the output of said blowers.

Each cylinder may however have only a single exhaust and inlet passage 1g and 1f, substantially aligned as shown.

The valve 1 is shown as entering the zone 1e, but it is, of course, understood, that the valve stem of valve 1 may only pass through the passage 1d, the zone lying beside the valve stem. The present figure is shown for the sake of simplicity and economy of drawings. The application of the method of operation, as explained later, being a matter of design, to suit a particular type of land-, air- or water-engine. It is also understood, that the valve 1 is shown in central position above the piston, of course, the Figs. 1 and 4 can be so explained that the valve may be eccentric for the explosion type of engine, the method of operation thereof being explained in the original explanation more in detail in view of stratification of active and inert gases. Therefore in the present Diesel type this position is obviously not imperative, as turbulence of gases is needed here. Such a turbulence may be partially obtained during the inlet already, by an eccentric position of the valve, like in standard engines where the inlet valve is always placed eccentrically. The basic operation is, as follows, employing the cam 17b of Fig. 1A. Said cam rotating at half engine speed, it lifts the valve for about 420° of engine revolution (it may lift even for 360°+2×60°=480°). When the crankpin is at b (inner circle of Fig. 3), the valve 1 is lifted. The burned gases escape. The piston descends to b', inner circle, and ascends to d, inner circle. (The upper edge of the piston is always considered here.) The piston descends, after the piston has pushed the burned gases to the left and to the right, unless pressure or suction is respectively applied on passages 1f and 1g, which causes the burnt gases to go almost exclusively to the right and the air to enter the cylinder from the left through 1f valve 1 closes at b'. After the piston passes again b', inner circle, and ascends to about point a, inner circle, the exhaust-inlet valve is closed, the piston compresses the air (or mixture of air and burned gas), and fuel is injected by the injector 24 towards the ends of the compression period, about 80° to 40° before the piston reaches its top position according to the speed of the engine. If valve lift is increased to 480°, the inertia of the gases fills the cylinder better at high speeds, valve 1 closing when piston is at f, Fig. 3. The amount of air to be compressed is equal to the displacement of the piston, (unless a blower is applied on passage 1f) at slow speeds, but considerably less than that at high speeds because of inertia of gases.

It is here proposed as a modification to supercharge said engine at the lower cylinder end, by means of an additional port 2a in the cylinder, controlled by the piston, and by preference by an additional sleeve valve. In case the latter valvular means is omitted, the inlet valve 1 has to be opened for exhaust before the piston uncovers the port 2a, exposing thereby the vanes of the blower to the pressure of the exhaust gases, which will cause irreparable damage, etc. Therefore if the blower 4 is applied on the lower end of the engine (at the upper end the blower 4, if there applied, but not for a supercharge, is exposed to a lesser degree to the exhaust pressure, as passage 1g connects directly with the atmosphere, or suction apparatus, ejection apparatus) the sleeve 3 should cover the ports 2a, when the piston uncovers said ports during the beginning of the exhaust period, (which may start now as late as point b', inner circle). The operation is as follows. To prevent contrapressure, the exhaust at top end of cylinder will start earlier normally 60° before b', Fig. 3. The piston ascends to d, driving out the burned gases, the piston descends and uncovers at e', the lower ports 2a in the cylinder. The sleeve 3 has in the meantime uncovered with its ports 3a, the ports 2a (see point e' in Fig. 2) and the blower blows an additional charge in the cylinder. The exhaust-inlet valve should in this arrangement close before the piston uncovers the ports 2a during the end of the inlet period, as the blower would not have a chance to supercharge the cylinder, the pressure escaping at the top end of the cylinder. Therefore in this arrangement the period of opening of the valve 1, should be about 420°−35°=385°, the valve 1 closing when the crankpin 21 is at e', inner circle.

Resuming, if the additional ports 2a are used without the sleeve valve 3, the exhaust should start at b and the compressor blows a scavenging charge and an additional charge in the cylinder alternately.—If the ports 2a are used with the sleeve valve 3, the blower blows only an additional charge in the cylinder, the exhaust being allowed to start as late as about b' in Fig. 3.

In both of these operations the means to vary the timing of valve 1, can be applied, as follows.—First operation 1° modified. (Variation of timing.) Supposing that the cam 17b is of such a form (be it a tangential, mushroom, constant acceleration etc. type) that it keeps the valve open 420°, and the exhaust period starts, when the piston is on the level of point b of the inner circle (Fig. 3), then the valve 1 will close again, when the upper edge of the piston is at b' (if points a to g are mentioned, the points on the inner circle of Fig. 3 are always meant). If the worm 13 is rotated clockwise, the shaft 15 can be advanced at least 60° of engine revolution (=30° rotation for shaft 15), in other words the cam 17b is rotated backwards, counterclockwise by the pinion 16 rotating clockwise, which pinion rotates the camshaft and cam 17b backwards. (Differential 13, 14e−h action has been explained before.) The cam therefore keeps the valve still open 60°, after the piston has reached its lowest position b' at the end of the inlet period. The air (or air plus burned gas, depending upon the pressure or throttling arrangement in the manifolds 1a and 1b as explained) has a certain inertia and at high speeds it will continue to fill the cylinder notwithstanding the fact that the piston has already started its compression stroke.

If the cam 17b is made larger than 420° opening, say 480°, the valve can be kept open longer past point f thereby rejecting a part of the charge, as the inertia of the gas will not be sufficient to fill the cylinder when the piston is going up, and a part of the charge will be rejected, decreasing thereby the final compression-temperature. As this temperature has to be a minimum to ignite the fuel oil, the part rejected cannot be too great, unless more burned gas is sucked in during the inlet period by the arrangement at the top end, as explained. Variation of timing can be applied here, as explained under a.

Reversely, if the length of opening of the valve is reduced to 360°, and is opened when the piston is at b, instead of b' (Fig. 3), the valve 1 will close at b before the piston has completed its suction stroke, the charge being less than the space swept by the piston. The previous method of rejection is preferred, as the partial filling causes loss of power on account of partial vacuum, though the part rejection of a charge causes a certain loss. Now variation of timing being applied. If valve 1 is opened at b', it closes at b' at the end of the inlet period, varying the volume of the charge also, but unable to make use of the speed of the gases to fill the cylinder better at high speed. Therefore the 420° opening is better, and the 480° still better, as rejection of a part of the charge may be effected to throttle the engine, by the use of variation of timing, with a single valve 1.

In the second arrangement, in which the additional ports 2a plus blower, plus sleeve are applied, the variation of the timing of valve 1 is somewhat different.—Supposing that the timing of valve 3 is not variable, and that the valve cam covers 360° opening, and the valve 1 opens for exhaust when the piston is about at b, Fig. 3, then the crank 3e on the eccentric shaft 3d is at b in Fig. 2. These points in Fig. 2 indicate the position of the upper edge of the port 3a in sleeve 3a. The sleeve covers now port 2a in the cylinder and protects thereby the blower 4, as explained. The piston goes up to d and exhausts the burned gas, the piston descends next to e and when the upper edge thereof reaches point e' in Fig. 3, the upper edge of port 3a is at e' in Fig. 2 and has the port 2a uncovered, giving the blower a chance to supercharge the cylinder, the cam 17b just having closed at e about the inlet valve 1 (it can close a little later 25°, at e') if the worm 13 is rotated clockwise and the shaft 15 is rotated clockwise, the camshaft is rotated backwards and the cam 17b opens later, when the piston is at b'. In Fig. 2 the crank 3e is at b', that means the upper edge of port 3a is at b', below the port 2a in the cylinder. The pressure cannot hurt the blower 4, as explained, the piston ascends, pushes out the used gases, the piston descends inhaling air past valve 1 (minus or plus burned gas) up to point e', and past it for about 35°, thereby making the blower a useless factor for a part, as the inlet valve is still open up to point b'. Thereafter it has still 35° left to supercharge the cylinder, as Fig. 2 shows that at e'', the port 2a is still uncovered. The piston cuts off the supercharge, and compresses it up to the point where the fuel injection begins to help to increase the compression and temperature raise due only to the piston movement.—If the cam is made larger, 420°, it can be deduced, of course, that if the valve opens at b in Fig. 3, that it closes at b' blower charging 35° from b'—e''; if it is retarded by the worm 60°, that it will be still open at b', and close at f in Fig. 3. In the first case the blower has still 35° to supercharge, in the latter case it cannot supercharge at all as the valve 1 is still open, up to e'', rejecting part of the charge, even from e'' to f.

If the cam is made longer than 420°, 480°, the operation of the retarding mechanism may even cause a greater rejection of the charge, though this would be hardly useful in most arrangements, unless for idling. The variation of the timing is therefore a very useful function to regulate the amount of working charge, the power output without affecting the output of the blower.

It can at the same time be seen that the variation mechanism may even be placed at 13a and 14b, c, d between the crankshaft and the eccentric shaft, as Fig. 2 shows, that even if point b is retarded in Fig. 2, 30°, that the port 2a in the cylinder will be already covered by the upper edge of port 3a in the sleeve, and if point e' is retarded 30°, it still will open the ports 2a to some extent and will uncover said ports for supercharge at least at e' and e'' in Fig. 2. The variation cannot and does not have to exceed much more than 60°, as the exhaust period cannot start much earlier than at b, 60° before bottom position of piston to prevent loss of power, and cannot start later than b', when the piston is in bottom position, as otherwise the final pressure will retard the piston too much, some time being necessary for the final pressure to disappear through valve 1.

*Resuming the different arrangements*

1. In Fig. 1, only valve 1 is used, without additional ports, 2a, sleeve 3, or blower 4. Cam 17b, may open valve for 360°, 420°, 480°.

2. In Fig. 1, valve 1 is used, plus additional ports 2a, and blower 4, but without sleeve 3. Cam 17a may have varying length.

3. In Fig. 1, valve 1 is used, plus additional ports 2a, sleeve 3, with ports 3a, and blower 4. Cam 17a may have also in this case varying lengths.

In all three cases the timing may be varied with either one of the differentials shown, the upper or lower one. If the sleeve is applied, the lower one is, of course, preferred, but this is not imperative.

In Fig. 1B, the valve 1 is displaced by a sleeve valve having a simple harmonic motion (almost harmonic).—If only the upper ports 3b'' in the sleeve 3 are used (shown at 3b) almost the same operation can be obtained, as explained for Fig. 1, if the sleeve 3 is there omitted. Variation of timing is the same as under 3, a, b, c.—If, however, in this case, the ports 3a of sleeve 3 are also applied on the lower end of this sleeve with a blower, plus, of course the ports 2a and 2b of Fig. 1 in the cylinder (ports 2a and 2b merge, as the sleeve is here inside the cylinder) the same operation can be obtained as explained for Fig. 1, if the sleeve 3 is there used. The mechanism for variation of the timing must be applied here between the crankshaft 23 and the eccentric shaft 3d, as the timing of the upper ports has to be varied together with the timing of the lower ports, if variation of timing is at all to be incorporated in a particular design. Supposing it is not incorporated, the greatest difference between the sleeve and the single poppet valve lies in the fact, that if a blower is applied on the inlet side 1a that this blower can scavenge the cylinder much more effectively during the end of the exhaust period than in the arangement of Fig. 1. The final dead space in Diesel engines of the smaller type, being already very small, this scavenging factor does not count much, and the cooling of the sleeve is more important especially at the exhaust side.

It is understood that this final compression space may be entirely in the head so that the face of the piston approaches the underside of the head entirely, as shown in my Patent No. 1,666,160 of April 17, 1928. The pulverizer is placed in the head and may have the same position as an ordinary sparkplug, or may be at angle towards the axis of said cylinder and offset from the cylinder axis. Equally the exhaust and inlet ports in the sleeve are opposite each other, as shown, and the edges of the ports in the sleeve, or the inlet ports in the cylinder wall, may be so shaped so as to increase the turbulence of the air in said chamber entering from one side of the periphery of the cylinder space, combustion space and the space swept by the circular piston. These ports in the cylinder wall may be therefore tangential in the sleeve or in the cylinder wall, or in both, to increase the rotational speed of the gases. If the fuel is introduced tangentially also, the fuel and air will mix thoroughly, and the tangent of both fluids may be even opposite to each other as desired, as is all well known in the art. These latter modifications are incidental to the arrangement shown in general, in which a single sleeve valve is used, preferably with inlet ports opposite exhaust ports, moving with a single reciprocating motion with an almost pure harmonic movement. Said latter movement may be modified by the action of said differential, said modification being substantially different from that obtained with a poppet valve, of which the acceleration of the closing and opening period may be varied within great limits. In this sleeve valve only the length can be varied of the opening and closing in proportion to the acceleration thereof. Therefore this variation of timing is specific for this sleeve valve, as would be the manner of introducing said air and the manner to introduce the supercharge with the same valve, which controls the inlet and exhaust.

It is further understood that the exhaust side of the sleeve may be connected with a manifold, in which the exhaust action in one cylinder may increase that of the other cylinder, as is well known in the art. The inlet side of the sleeve may communicate directly with the atmosphere for every single cylinder.

It is further supposed that the inlet port may have a peripheral width greater than that of the exhaust port or reversely, and it is further understood that the exhaust port may be opened over said reentrant head slightly in advance of the inlet port so that the same exhaust port may also be closed a little later than the inlet side. The advantage of the lead at the exhaust side is greater than the disadvantage of the later closing of said same exhaust side.

It is however, also supposed that the exhaust-inlet ports may extend around the entire periphery of said sleeve and cylinder, each sleeve and cylinder communicating directly with the atmosphere, which latter construction has the advantage of greater valve opening for both periods, the exhaust and inlet, but the disadvantage of the imperative absence of an exhaust manifold and muffler, and of an inlet manifold for a multiplicity of engine cylinders, arranged in a row or radially.

It is further understood, that if the resistance of the friction in the valve gear on one side and crankshaft gear on the other side are so that the rotation of the worm 13 moves both the valve gear and the crankshaft gear both forward and backward without changing their relative position to each other, (especially when the engine is at a standstill) that the crankshaft may be provided with means to prevent its rotation together with the valve gear. While the engine is running the momentum of the crankshaft gear and reciprocating parts is so great compared with that of the valve gear that the differential action will only advance or retard the valve gear with respect to the crankshaft gear. This possibility of equal resistance is however very small, especially if the eccentric shaft is geared with a reduction to the crankshaft and reciprocating masses.

It is understood in Figs. 4, 5, 6 that the ports in this two-stroke engine may be controlled equally by a sleeve valve as shown in Fig. 1B, but of course, reciprocated at the frequency of the piston. The exhaust ports may be then at the top end and the inlet ports at the lower end as shown in Fig. 1B, but they may be equally reversed in position.

It is also understood that the Venturi passage beyond the valve in Fig. 1 may be applied on the sleeve valve of Fig. 1B, if said sleeve valve has a single exhaust-inlet port, or the exhaust port opposite the inlet port.

It does not make any difference whether the disclosed arrangements are used in air-cooled engine or a liquid cooled engine, or in engines having a cross combination of both. The supercharging cannot take place at the top end, as the pressure will disappear towards the exhaust manifold $1b$, therefore if, supercharging is to be done with a single valve, it has to be done from the lower end of the cylinder.

In Fig. 1B, the lug $3b$, plus wristpin $3b'$, has been shown between the upper and lower ports for sake of economy of drawing. It is, of course, understood that like in standard Knight engine, the lower part of the sleeve sticks out from the lower end of the cylinder, and the lug is of course attached to this lower part of the sleeve.—Supposing that the eccentric shaft $3d$ opens the upper ports for 360°, and the exhaust starts, when the piston is at $b'$, bottom position, the port $2a$ in the cylinder is still about uncovered when the crank $3e$ is at $b'$, Fig. 1B. Therefore it is better to lengthen the period at the top end of the cylinder to 420°, so that the exhaust period starts at $b$, Fig. 3 at the top end of the cylinder, before the ports $2a$ in the cylinder are uncovered by the piston at $e'$, Fig. 3, during the beginning of the exhaust period. 360° further, the piston is again at $e$ Fig. 3 during the inlet period, and at $b'$, Fig. 1B, the ports $3a$, in the sleeve just begin to uncover the ports $2a$ in the cylinder, and the blower can supercharge the cylinder for a short period. If the port $2a$ is lowered or the port $3a$ in the sleeve enlarged, the port $2a$ in the cylinder will be liberally uncovered during the beginning of the exhaust period and the closing end of the inlet period. For the ports $3b''$, the lower edge has to be considered, for ports $3a$ the upper edge.—As the exhaust period starts preferably 60° before bottom position of the piston, and the inlet period closes about an even number of degrees after bottom position of the piston, the point $a$ for the eccentric $3e$ falls practically at the top position, when ignition (injection) occurs. Therefore, if the upper ports are open 360°+120°=480°, the points $b$ and $f$, respectively during the exhaust period and inlet period, are as shown in the circle of Fig. 1B, under the crank $3a$ of the eccentric shaft. There is therefore little space to have the ports $2a$ in the cylinder closed during the beginning of the exhaust period to protect the blower, and open during the end of the inlet period to supercharge the cylinder. In a Diesel engine this is no great objection, as the scavenging will cool in this particular case the sleeve. The exhaust period at the top end however has to start early, unlike in the arrangement of Fig. 1, where the point $a$ for the eccentric $3e$ can be placed 60° past its top position, as shown and explained for Fig. 2 in relation to Fig. 1.

*Resuming the variations of Fig. 1B*

1. Only the upper ports $3b''$ are used, without the lower ports $3a$ in the sleeve $3$, and without a blower. The opening of these upper ports may have varying lengths as for Fig. 1.

2. The upper ports 3b'' and lower ports 3a are used, plus a blower. The length of opening of both ports may be different. In both cases the lower differential of Fig. 1 may be applied to vary the timing of the opening and closing of the upper and lower ports, said opening and closing itself may be of different length between 360° and 480°.

Referring to Figs. 1C and 1D, a modification of Fig. 1 is shown. The outlet end of the blower 4 is connected with the inlet passage 1a, and air from there enters each passage 1f of each cylinder.

If in Fig. 1 the piston 18 is approaching its top dead center position, it is clear that if there is a pressure in passage 1f that all the exhaust gases from the cylinder during the exhaust period are blown out through the passage 1g into the exhaust passage 1b. The pressure in inlet manifold 1a may blow a certain amount of air into the exhaust manifold 1b, but the major part of it will be drawn down into the cylinder by the down-going piston on the next inlet stroke. However, no supercharge can be effected that way unless the exhaust passage 1b is strangulated and partly closed by a valve or by the action of a muffler, or any other equivalent device. Therefore supercharging is effected through a lower port. The differential mechanism is actuated by hand. However, it would not amount to invention to actuate the differential action by a governor so that at certain speeds the timing of the valve-mechanism beyond said differential is affected by said governor and differential. In the arrangement shown the differential is supposed to be actuated by hand, but the actuation by other speed controlling mechanism would not amount to invention in view of the present specification.

Referring to Fig. 4, 31a is a cylinder, 31 the exhaust valve in the top of the cylinder, scavenging ports 32 connected with a blower 36 delivering higher pressure than the ports 33, connected with another blower delivering lower pressure than said first blower (by different speeds, or different size of vanes etc.). 35 is the exhaust port connecting the atmosphere with the cylinder space via said valve 31. 56 is the usual fuel injector. 34 is the piston-top having a concave surface. 49 is the piston proper, connected by a wristpin 48, and connecting rod 47, to a crankpin 46a, connected with a crankarm 46 to a journal pin 45. A gear wheel 44 on said crankshaft-axis, driving by a chain 43 a shaft 42a, carrying a gear wheel 41, connected with a pinion 50, on a shaft 51, carrying on the other end a pinion 52, driving a gear wheel 53, on a cam shaft 54, carrying a cam 55. Said same shaft 42a, carries a gear wheel 41a meshing with a gear wheel 39 on the upper blower 36 and a gear wheel 40 on the lower blower 37. Both blowers are here supposed, of course, to be normally without fuel mixing means, as shown at 38 for the lower blower (and 5 for the blower of Fig. 1). A priming of the cylinder with a poor mixture by means of said fuel mixing means for starting purposes may be, of course, incorporated, according to what is known in the art. This mixture may be ignited by a spark plug or heating torch not shown, but these features are not a part of the present invention, though they may be combined therewith in Fig. 1, as well as in Fig. 4.

Fig. 5 shows in the inner circle, the positions of the upper edge of the piston for a two stroke cycle. It is here again supposed that the piston travels an equal distance up and down during the upper part of rotation of the crankshaft, as during the lower half of rotation. This assumption does not affect sufficiently the practical application of the following proposed engine function, like for Figs. 2, 3 and 1B, explained before in the same way. The operation is as follows. At a the piston is in top position, the charge expands, and the cam 55 lifts the valve 31 at about b, (Fig. 5) 64° before the bottom position of the piston. At b' the pressure is decreased sufficiently to avoid damage to the blower 36, which begins to drive a scavenging charge in the cylinder, escaping via the open valve 31. The piston uncovers next port 33, and blower 37 drives a complementary charge in the cylinder at lower pressure, from point c to point d, in Fig. 5. The cam 55 may begin to close the valve 31 at about c' or b'', when the piston is exactly in bottom position, or may even close as late as d, (=16°) when the lower port 33, and blower 37 are shut off. From d to e the upper port 32 is still open and the blower 36, with higher pressure may supercharge the cylinder, valve 31 being closed. The piston closes port 32, compresses the charge, and the injector is put in action some time before the piston reaches its top position, about 90° to 30° before the piston reaches again the top position, point a, after which expansion takes place: In this arrangement, of course, the variation in timing as explained for Fig. 1 can be applied. Supposing that the valve 31 is lifted 64°+32°=96°, this variation may open the valve 31 before the piston reaches point b in Fig. 5, and close before the piston reaches point d, so that the blower 37 may be even able to supercharge at high speeds, the exhaust starting early. Reversely, if the valve 1 opens a little before the piston reaches b' (the blower 36, if being able to withstand a pressure of about 3 atmospheres or less) the port 32 will be closed by the piston going upwards before or about at the time the valve 31 closes, so that even the more powerful blower 36 has no chance to effect an appreciable supercharge, if any. It is understood that the cam opening is supposed to be about 96°, but it is quite possible to use a longer opening 96°+14°=110° so that even a part of the charge may be rejected through valve 31, as similarly explained for Fig. 1, the four-stroke-cycle type. In that case the exhaust starts very early at b and the valve closing is made late in the cycle, at point e for instance. Advancing and retarding of timing of valve 31, may supercharge or cause rejection of charge. This method of variation appears therefore very useful in regulating the quantity of the charge within the limits in which a reliable fuel-injection-ignition can be obtained. It is therefore understood that here, as in the case of Fig. 1, the exhaust 35 may be strangled or throttled to retain a certain amount of burned gas, to obtain a certain ignition-temperature with a partial, full charge, or supercharge. The scope of variations is here as in the previous case rather large and experimentation has to be done to obtain a certain required type of engine according to the work it has to perform. The physical data of the gas laws, concerning volume, pressure and temperature, and polytropic compression are well known, and nothing more should, or can, be given here than the general characteristics on which an engine should be founded, in order to avoid the obstacles and disadvantages of the well known standard construction with two valves for the inlet and exhaust in the four-stroke-cycle type; and absence of valves in the two-stroke type, in which the opening and closing of ports at the lower end of the cylinder by the piston cannot be varied unless with great mechanical complication. It is the purpose of this explanation to point the way for successful experimentation, and suppleness of operation, with minimum mechanical complexity.

It is supposed in Fig. 4 that the double port 32, 33 may be merged into a single port (merging is in vogue right now) and the two blowers into one, without changing the fundamental arrangement of the single valve in top, of which the closing and opening can be made variable in the way explained and with the consequences and results explained.

Resuming the variations of Fig. 4

1. Valve 31 is used without variation of timing. Blower always used (or crankcase compression, plus the additional or minus the additional pressure of a blower filling said crankcase, as will be explained later in connection with Fig. 6).

2. Valve 31 is used with variation of timing.

In both cases the cam length may be different, and the two lower ports may be merged into one, as shown in Figs. 1, and 1B.—Fig. 6 shows only the lower part of a cylinder and a crankcase, in which a blower drives air, which is therein compressed. The top part may be that of Fig. 1 for a four-stroke-cycle operation, it may be that of Fig. 4 for a two-stroke-cycle operation.

Referring to Fig. 6, 61a is the cylinder, 62 a circumferential port in the cylinder communicating with the blower 69, through a passage 62, in which the fuel mixing means 67 and 68 are thought as being eliminated. 63 is a second circumferential port, opened and closed by the upper edge of the piston 64, this latter port communicating with the crankcase 61b by means of passage 65, which may surround the entire cylinder. The piston has an annular concave ring 64, as shown, the outer circle of which coincides with the edges of the ports, which are slanted downwards towards the piston, like in Fig. 4 in which the piston has only a concave surface, without a baffle in the center, as in Fig. 6. The piston carries a wristpin 76, connected with a rod 75, connected with a crankpin 74, on a crankshaft 73, carrying a gearwheel 72, driving a chain 71, driving a gearwheel 70, on the axis of a blower 70.

In the following two variations, Fig. 5 should be used for both cycles. Supposing the top part of Fig. 1 is applied on Fig. 6, together with the mechanism to vary the timing of this valve 1 for a four-stroke-cycle operation, and the cam 17a, or 17b, has an opening length of 420°, and the valve 1 opens at point b in Fig. 5, the exhaust pressure escapes via valve 1. The piston uncovers at b', Fig. 5, the port 62, and the blower 69 begins to scavenge. Piston 64 uncovers next port 63 at c, Fig. 5, and the crankcase, being filled by the blower via the passages 66 in the lower end of the piston, when the piston was near its top position, helps the blower to scavenge with a higher pressure, which is very useful at low speeds when the centrifugal type of blower does not develop enough pressure to do any serious scavenging. This pressure cannot pass the blower at low speeds. Supposing the crankcase doing the greatest part of this scavenging business, the piston cuts this short when rising to point d, Fig. 5. The blower finishes the scavenging, provided the engine speed will allow it do it. The blower may be independent of course of the engine speed, and electrically driven as is well known in the art for big Diesel engines. The piston scavenges the part-air, or pure air-charge left, and descending draws via valve 1, air, or air plus burned gas, in the cylinder. The valve 1 closes in bottom position b'' Fig. 5, and the crankcase alone or with the blower (depending upon the speed of the engine) may somewhat supercharge the cylinder from b'' up to e, Fig. 5. Piston compresses charge, and the fuel injector puts the finishing touch thereto, before it reaches its top position. Expansion, and repetition of cycle next.—The cam opening of 420°, may be advanced or may be reduced here in this arrangement to 360°, valve 1 opening at b, and closing at b, Fig. 5 so that the blower and crankcase has plenty of time to deliver a supercharge at high speeds. The variation of the timing of valve 1 may here again increase or prevent the supercharging as explained for Fig. 1, and the two ports 62, 63 may be reduced to one, served either only by the blower, (in which case Fig. 1 with additional ports 2a is obtained), or only by the crankcase (filled by the blower with a supercharge), or by the crankcase and blower simultaneously.

For a two-stroke-cycle operation, the top of Fig. 4 is applied on Fig. 6, together, by preference, with the timing variation mechanism of Fig. 1. The operation or various methods of operation, by different lengths of cam and retarding and advancing the opening and closing of valve 31 is or are here substantially the same, as explained under Fig. 4. Only with this difference that the crankcase if filled by the atmosphere can produce at low speeds a higher pressure than the blower. (If filled by the blower, as shown, it will have a high pressure also at high speeds.) The crankcase is in this arrangement also filled by the blower via the bypasses 66 in the piston. This is not absolutely necessary, as this charge may enter the cylinder through any port at the lower end of the cylinder, uncovered by the lower skirt of the piston, when this piston is near its top position. However the present arrangement is preferred, as the oil from the cylinder wall accumulates in the bypasses, which are blown clean by the pressure of the blower.

In the four-stroke-cycle, the blower plus crankcase scavenge during one revolution, and supercharging during the other revolution.

In the two-stroke-cycle they lead both a more strenuous life, and scavenge and supercharge during each revolution. In both cases the retarding or advancing of the valves 1 and 31, may increase, diminish, or eliminate entirely the supercharging with corresponding lengths of opening and closing of said valves.

It is understood, that the sleeve valve arrangement of Fig. 1B can also be applied on the combination of Fig. 6 with Fig. 1, the lower port 3a communicating the crankcase with the blower, when the piston is near its top position, and with the piston chamber, when said piston is near its bottom position. The upper ports 3b'' functioning like in Fig. 1 or 1B, as explained for a four-stroke-cycle. In the combination of Figs. 6 and 4 for a two-stroke-cycle operation, the same sleeve with the ports 3b'' and 3a can be used, only in this case the sleeve valve 3 has to be reciprocated of course with the same frequency as the crankshaft, from a similar eccentric shaft 3d. In both cases the variation of timing for said sleeve, as explained can be applied.

Resuming the variations of Fig. 6

1. For a four-stroke-cycle, the valve 1 of Fig. 1 may have varying length, between 360° and 480°, and the variation of timing may regulate the volume of the charge compressed, by partial rejection and supercharge above atmospheric pressure.

2. For a two-stroke-cycle, the valve 31 of Fig. 4 may have varying length, between 64° and 120°, as a minimum and maximum respectively. Variation of timing may be equally applied here, regulating the volume to be compressed for ignition, by means of rejection and supercharging above atmospheric pressure.

In both cases the pressure of the air charged may be derived from the crankcase compression alone, filled by preference by a blower to obtain a sufficient pressure at high speeds to supercharge the engine above atmospheric pressure, or crankcase compression simultaneously cooperative with the pressure of a blower, as shown. In the latter case the crankcase may be filled with atmospheric pressure or with the pressure of a blower, as shown, in which latter case the blower may fill the crankcase via the piston bypasses 66 space as shown, or directly into the crankcase chamber, (not shown) below the skirt of the piston 64, which skirt has to be then shortened.

Finally little has to be added to the description of Figs. 7, 8, 9 and 10. They speak for themselves in relation to the foregoing description.

In Fig. 10 the inlet manifold is again 1a, the inlet valve of each cylinder is designated by the number 79. The cylinder head by 77, the spark-plug or injector by 77a, the exhaust manifold by 1b. The upper edge of the piston in top dead center position by 18a and the bottom dead center thereof by 18a¹. The supercharging passage by 83 and the corresponding lower ports, in the sleeve 80, by 82. The exhaust ports in the upper end of the sleeve by 81, and the drive of said sleeve by 84. It is understood that the differential may again vary the timing of this sleeve.

It is finally understood that the differential shown may not only be incorporated to advance and retard the timing of the valves, but may be, of course, incorporated between any mechanism associated with the crankshaft of said engine, in order to control the function and speed of the engine by means of such an intermediate differential.

For instance the injection pump of the Diesel type may be timed by such a differential, that is the injection may be retarded or advanced during the operation of said engine in order to control the function and speed thereof. Usually ignition devices are connected or associated with the camshaft drive and a differential between crankshaft and camshaft would advance and retard equally the ignition-moment, or injection-moment, in the four or two-stroke-cycle engines shown and described.

What is claimed is:—

1. In an internal combustion engine of the Diesel type, of the airless fuel injection type, a cylinder, a piston reciprocating therein, a valve in the top end of said cylinder said valve and valve-port initiating the exhaust period and remaining open during substantially the entire following exhaust and inlet period, valve gear driven by said engine to operate said valve, a differential interposed in said valve gear between said valve and said engine to advance and to retard the timing of said valve.

2. A Diesel engine, having a cylinder, a valve in the top end of said cylinder said valve and valve-port initiating the exhaust period and remaining open during substantially the entire following exhaust and inlet period, valve gear to operate said valve and driven by said engine, a differential interposed in said valve gear, to advance and retard the timing of said valve, said valve connected by an inlet passage to an air pump, said same valve connected to the atmosphere by another exhaust passage, said pump driving air into said cylinder past said valve and an amount of air directly into the atmosphere, the variation of the timing of said valve by said differential controlling the amount of air passing into said cylinder.

3. In a Diesel engine of the airless fuel-injection type, a cylinder, a piston reciprocating therein, at least one valve in the top end of said cylinder, said valve and valve-port initiating the exhaust period and remaining open during substantially the entire following exhaust and inlet period, said cylinder being otherwise permanently closed at the top end thereof, a single cam on a camshaft driven from the crankshaft of said engine, a differential between the said camshaft and crankshaft in order to retard or advance the timing of said valve in relation to said crankshaft during the operation of said engine.

4. In an internal combustion engine, a crankshaft, a valve gear, a differential between said valve gear and said crankshaft to advance or retard the timing of said valve gear, said differential operated during the running of said engine.

5. In a four-stroke-cycle engine, a crankshaft, a cylinder having an exhaust-inlet valve in the top end of said cylinder, valve-gear to lift said valve, a differential-mechanism between said valve gear and said crankshaft to retard or advance the timing of said valve during the running of said engine.

6. In a two-stroke-cycle engine, a valve in the top of said engine, a crankshaft, a valve gear to operate said valve, a differential mechanism to retard the timing of said valve or to advance it during the running of said engine.

7. In a four-stroke-cycle engine, a crankshaft, said crankshaft driving additional mechanism of said engine controlling the speed and function of said engine, a differential mechanism between said crankshaft and said additional mechanism to retard or advance said additional mechanism during the running of said engine.

8. In a two-stroke-cycle engine, a crankshaft, said crankshaft driving additional mechanism of said engine controlling the speed and function of said engine, a differential mechanism between said crankshaft and said additional mechanism to retard or to advance said additional mechanism during the running of said engine.

9. In a Diesel engine, a cylinder, valve-means and similar mechanism to control the speed and function of said engine, a differential mechanism between said crankshaft and said speed controlling mechanism in order to retard or to advance the speed of said engine.

JEAN A. H. BARKEIJ.